May 25, 1948.  E. M. KENNEDY  2,442,087

WELDING ROD

Filed March 2, 1945

INVENTOR
EDWARD M. KENNEDY
By John Flam
ATTORNEY

Patented May 25, 1948

2,442,087

UNITED STATES PATENT OFFICE 2,442,087

WELDING ROD

Edward M. Kennedy, Los Angeles, Calif., assignor to Mills Alloys, Inc., a corporation of Delaware Application March 2, 1945, Serial No. 580,508

7 Claims. (Cl. 219—8)

This invention relates to the art of welding, and particularly to welding rods. Such a rod may be used in electric welding as one of the electrodes for the arc which fuses the rod and thus forms the weld, or the rod can be used in oxyacetylene welding. In any case, the rod is melted by the heat of the welding torch, or by electric energy. The molten material which constituted the rod is caused to adhere to or unite with the work. The use of such rods is well known; for example, by appropriate choice of the material forming the rods, they may be used to apply hard-facing material to a well bit, or other device, which it is desired to protect from wear, or to build up worn or defective parts, or to supply molten material for fusing parts together.

Such welding rods often comprise a thin, tubular shell of suitable material with a filling of the material to be deposited by the weld. Thus, if it is desired to deposit a hard metal facing, the tube may be filled, for example, with a mixture of finely divided tungsten carbide and a flux, while for forming a weld or for building up defective parts, the tube may be filled with the appropriate mixture.

It is an object of this invention to provide a method of making a welding rod of this character.

It is another object of this invention to provide such a method wherein the filling is compacted to obtain a more uniform consistency.

It is another object of this invention to provide a welding rod upon which, when used as an electrode in arc welding, the arc will remain symmetrically placed.

It is another object of this invention to provide a welding rod to permit ready escape of any gas which may form within the rod during welding.

This invention possesses many other advantages, and has other objects which may be made more clearly apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Figure 7:
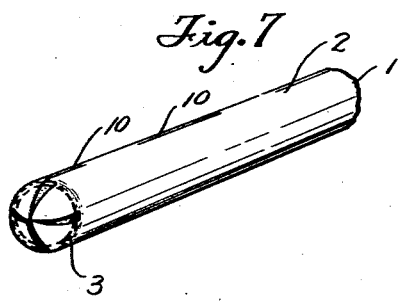
Fig. 7 is a pictorial view on an enlarged scale, showing the end portion of a completed welding rod.

Referring to Fig. 7, the end portion of a finished welding rod 1 is shown, the rod comprising a thin, cylindrical shell or tube 2 of relatively small diameter, for example, of from one-eighth of an inch to three-eighths of an inch, and having a thickness of from .014 inch to .062 inch, depending on the diameter, the length of the shell 2 being from about fourteen inches to about twenty-eight inches. The ends of the shell 2 are closed, as indicated at 3, the shell being filled with an appropriate welding mixture, such, for example, as tungsten carbide and a suitable flux.

Figure 1:
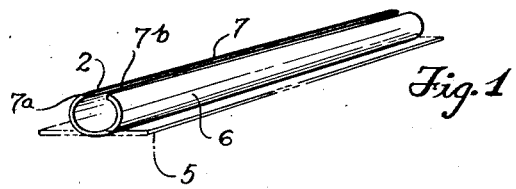
Figure 1 is a pictorial view showing the initial step in the method of making a welding rod in accordance with the invention.

The first step in making the rod 1 is the forming of the shell 2, which may be of mild steel. This step, as shown diagrammatically in Fig. 1, comprises transversely bending a strip 5 of suitable material (indicated by broken lines) to form initially a trough-like element 6 with a longitudinally extending opening or split 7. It is to be understood that the strip 5 is of sufficient length to provide shells 2 for a plurality of rods 1.

Figure 2:
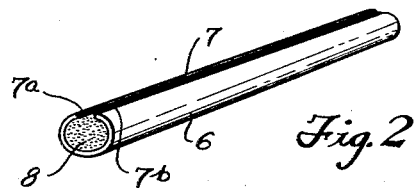
Fig. 2 is a pictorial view of a fragment of welding rod at the completion of the next step.
Figure 3:
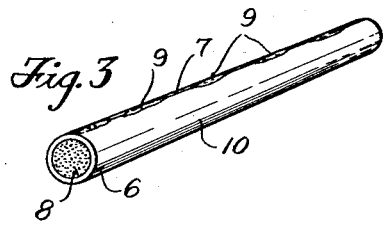
Fig. 3 is a pictorial view of a fragment of welding rod at the completion of the third step.

The split shell or tube 6 is next filled with the welding mixture 8, as indicated in Fig. 2. The mixture 8 in the shell 6 is then levelled to remove the surplus from between the edges 7—a and 7—b of the split 7, and the split closed by bringing these edges into abutting relation, as by the aid of rollers. These edges 7—a and 7—b are then joined as by arc welding, the weld being shown at 9 in Fig. 3, to form the shell 2.

The weld 9 may extend continuously throughout the length of the shell 2, but it is preferred that it be discontinuous to provide spaced portions 10 of the split 7 which are sufficiently open to permit escape of any gas that may be generated in the interior of the tube in the subsequent use of the rod 1. This is a valuable feature which facilitates the use of the rod and improves the quality of the weld formed by its aid.

Figure 4:
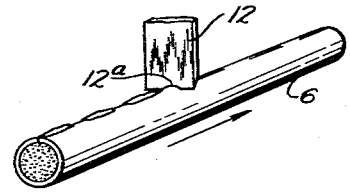
Fig. 4 is a pictorial view showing a succeeding step.

After the element 6 has been closed and welded, any surplus metal resulting from the welding operation is removed from the exterior thereof. For this purpose, the shell 6 is caused to pass axially in contact with a fixed shaving blade 12 (Fig. 4). The blade 12 has an arcuate cutting edge 12—a curved to suit the diameter of the shell.

Figure 5:
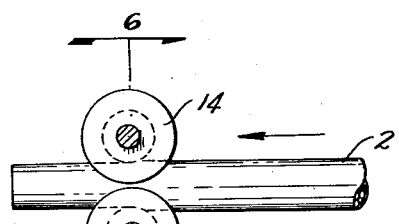
Fig. 5 is an elevation showing a succeeding step.
Figure 6:
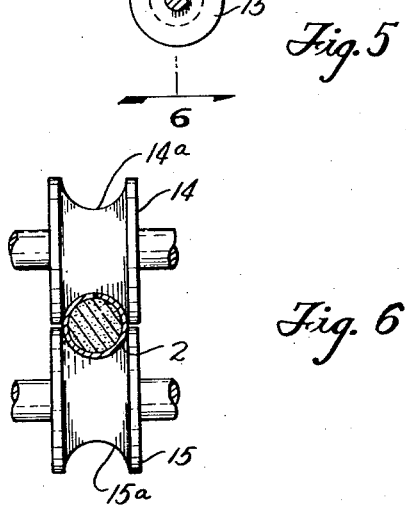
Fig. 6 is an enlarged section, taken as indicated by line 6—6 on Fig. 5.

After removal of the surplus metal, the shell 2 is compressed slightly to reduce its diameter and thus compact the welding mixture 8. This may be done conveniently by advancing the shell 2 axially between a pair of cooperating rollers 14 and 15 (Figs. 5 and 6). As clearly shown in Fig. 6, the rollers have concave faces 14—a and 15—a which substantially encircle the shell 2 and thus exert a peripheral pressure reducing the diameter of the shell. A reduction in diameter of the order of .015 of an inch has been satisfactory.

Such compacting of the welding mixture 8 has important advantages. Thus, when the rod is used as one of the electrodes in arc welding, the arc is caused to remain symmetrically placed on the rod and does not move around.

After the reduction and compression, the shell is cut into the desired lengths and the ends closed by swaging, as indicated at 3 in Fig. 7.

By the aid of this process, the compacted filling 8 is in such form that, when the rod is used as an electrode in electric arc welding, the arc remains stable and does not move around on the tube end.

The inventor claims:

1. The method of making a welding rod which comprises joining the edges of a longitudinally split tube filled with a welding mixture in a manner to leave spaced portions of the split pervious to gases from the mixture, smoothing the exterior of the tube adjacent the joint, peripherally compressing the tube to compact the mixture, and closing the ends of the tube.

2. The method of making a welding rod which comprises welding the abutting edges of a longitudinally split tube filled with a welding mixture, removing the surplus material from the exterior of the tube adjacent the weld, subjecting the tube to axially progressive peripheral pressure to compress the tube and compact the mixture, and closing the ends of the tube.

3. The method of making a welding rod which comprises welding in a discontinuous manner the abutting edges of a longitudinally split tube filled with a welding mixture to leave spaced portions of the split open, removing the surplus material from the exterior of the tube adjacent the weld, subjecting the tube to peripheral pressure to compress the tube and compact the mixture, and closing the ends of the tube.

4. The method of making a welding rod which comprises forming a tube having a longitudinally extending opening for its entire length, filling said tube with a welding mixture, levelling the mixture within the tube so that said opening is free of the mixture, joining the edges of the opening by welding, removing the surplus metal from the weld, subjecting the tube to an axially progressive peripheral pressure to reduce the diameter of the tube and compress the filling, and cutting said tube to a predetermined length and closing the ends of the tube.

5. The method of making a welding rod which comprises transversely bending a thin metal strip to form a trough, leveling a volume of welding mixture in the trough, bending the edges of the trough to an abutting relationship to form a tube, joining the abutting edges upon a longitudinal axis to encase firmly the welding mixture, subjecting the tube to an axially progressive peripheral pressure to reduce the diameter of the tube and further compress the welding mixture, and finally closing the ends of the tube.

6. The method of making a welding rod which comprises transversely bending a thin metal strip to form a trough, leveling a volume of welding mixture in the trough, bending the edges of the trough to an abutting relationship to form a tubular support firmly encasing the welding mixture, subjecting the tube to an axially progressive peripheral pressure to reduce the diameter of the tube, and further compress the welding mixture, and finally closing the ends of the tube.

7. A welding rod comprising a hollow thin metal tube, connecting means for the edges of the tube, including a plurality of welds spaced to form longitudinal apertures for the escape of gases, welding mixture in the tube, and closure means for sealing said welding mixture tightly in said tube.

EDWARD M. KENNEDY.

REFERENCES CITED

The following references are of record in the file of this patent:

UNITED STATES PATENTS

| Number | Name | Date |
|---|---|---|
| 1,531,823 | Armor | Mar. 31, 1925 |
| 1,629,748 | Stoody | May 24, 1927 |
| 1,704,978 | Knott | Mar. 12, 1929 |
| 1,789,656 | Kotchi | June 20, 1937 |

FOREIGN PATENTS

| Number | Country | Date |
|---|---|---|
| 513,045 | Great Britain | Dec. 20, 1937 |